United States Patent Office 3,036,975
Patented May 29, 1962

3,036,975
RAPID-CURING EPOXY RESIN COMPOSITIONS AND METHOD OF MAKING
Bernard Taub, Buffalo, N.Y., assignor to Allied Chemical Corporation, New York, N.Y., a corporation of New York
No Drawing. Filed Jan. 2, 1959, Ser. No. 784,452
18 Claims. (Cl. 260—2)

This invention relates to new complex poly (amino-amide) epoxide compositions and more particularly such compositions capable of conversion into insoluble, infusible products useful in the preparation of castings, coating compositions, adhesives and the like and to the method of their preparation.

Epoxy resins are formed usually as the result of the reaction of an epihalohydrin with a polyhydric phenol or an aliphatic polyol in the presence of base. The epoxy resins, so produced, contain terminal epoxide groups and hydroxyl groups throughout the polymer structure. Epoxy resins can readily be transformed from viscous liquids to tough hard thermoset solids. This transformation or "cure" is effected by the addition of a chemically active curing agent or catalyst. Certain mixtures of epoxy resin and agent can be cured at room temperature, the exothermic heat of the reaction being sufficient to produce a tough hard solid. However, in order to produce a material possessing optimum properties external heat must be provided. The cured epoxy resins are suitable for use in making varnishes, protective coatings, molding or potting compositions, films, etc., with or without the addition of various adjuvants, such as pigments, fillers, modifying resins and the like.

The prior art teaches the use of a wide variety of curing agents for reaction with epoxy resins. The curing agents are acidic or basic organic compounds containing groups capable of reaction with the epoxy and/or hydroxyl groups in the epoxy resin. The most widely utilized class of curing agents are polyamines, especially aliphatic or aromatic diamines, containing primary and/or secondary amino groups. Many of the aliphatic diamines employed are relatively low boiling liquids that give rise to toxic and/or flammable vapors during the curing reaction and thus their use incurs a hazard. Further, epoxy resins cured with aliphatic diamines suffer from the disadvantages of low heat distoration temperatures and dark color, and coatings obtained from epoxy resins cured with these agents generally are brittle. With aromatic diamines, a high "cure" temperature is required to produce the desired hard end product. The condensation products of unsaturated fatty acids with aliphatic diamines when used as curing agents produce viscous mixtures with epoxy resins. These require a twenty-four hour high temperature (150° C.) cure. Epoxy resin compositions cured with acid anhydrides are unsuited for the production of adhesives and coatings due to slow cure.

An object of the present invention is to provide cured epoxy resin compositions having high heat distortion temperature.

A further object of this invention is the preparation of cured epoxy resin compositions which are light in color and which are suitable for use in the production of castings, as flexible coatings, adhesives, varnishes, etc.

The epoxy resins which are employed in the production of the compositions of this invention are in general those resins produced by the reaction of epihalohydrin with an aliphatic polyol or an aromatic polyhydric phenol in the presence of a base. Such epoxy resins contain terminal epoxide groups and also hydroxyl groups along the polymer chain. Commercially the more important of these resins are derived from bisphenols and epichlorhydrin; these epoxides contain alternating phenol residues and aliphatic groups, including hydroxyl containing intermediate aliphatic groups and epoxide-containing terminal aliphatic groups. In general the resins are free from functional groups other than hydroxyl and epoxide groups.

The novel epoxy resin compositions of this invention contain basic curing agents obtained by condensing ε-caprolactam with a polyamine containing at least two primary amino groups. The condensation can be carried out by heating a mixture of ε-caprolactam and the polyamine at elevated temperatures, generally between about 150° C. and 300° C. and in molor ratios of at least about 1 mol of caprolactam to 1 mol of polyamine. Preferably an equimolecular ratio of reactants is heated at 180° to 225° C. for about 24 hours. The reaction products preferably contain at least two amide groups and two primary amine groups per molecule and are liquid. Solid products, e.g., such as are obtainable from caprolactam and hexamethylene diamine, are difficult to handle and therefore their use in the preparation of potting compositions is undesirable. However, they may be dissolved in a suitable solvent and used in coating compositions. Suitable polyamines for the manufacture of these poly (amino-amides) are aliphatic amines such as ethylene diamine, propylene diamine, butylene, diamine, diamino pentane, diaminohexane, diethylene triamine, triethylene tetramine, tetraethylene pentamine, etc.; aromatic amines such as m-phenylene diamine, o-phenylene diamine, p-phenylene diamine, 4,4'-methylenedianiline or substitution products thereof containing alkyl, halogen groups, etc.; aralkyl diamines such as xylylene diamine, p-aminobenzylamine, etc.

The amount of poly (amino-amide) curing agent employed with the epoxy resin may be varied considerably depending upon the use for which the final cured product is destined. For potting or casting compositions the amount of basic curing agent utilized is preferably within the range of from about 10% to about 35% by weight of the epoxy resin content; with the lower amounts of poly (amino-amide) the heat distortion temperatures of the completely cured compositions are somewhat lower. To obtain maximum chemical resistance and thermal properties the amount of caprolactam-polyamine reaction product employed is preferably in the range of from 17% to 25% by weight of the epoxy resin.

The more detailed practice of the invention is illustrated by the following examples, in which parts given are by weight and temperature is in degrees centigrade. It is not intended that the scope of the invention should be limited by the specific examples.

EXAMPLES (a) *Preparation of the Curing Agent*

(i) 226 parts ε-caprolactam and 378 parts tetraethylene pentamine were heated, with agitation to 215° in an atmosphere of nitrogen for 24 hours. On completion of the reaction excess polyamine was removed by vacuum distillation, giving a yield of 380 parts poly (amino-amide). 92% of the theoretical for the reaction of the ε-caprolactam to give a compound analyzing for the following formula

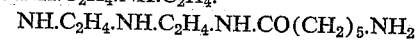

$NH_2 \cdot (CH_2)_5 \cdot CO \cdot NH \cdot C_2H_4 \cdot NH \cdot C_2H_4 \cdot NH \cdot C_2H_4 \cdot NH \cdot C_2H_4 \cdot NH \cdot CO(CH_2)_5 \cdot NH_2$ (ii) A poly (amino-amide) was prepared by the same method (as above in part (i)) from 226 parts ε-caprolactam and 206 parts diethylene triamine.

(iii) The poly (amino-amide) from ε-caprolactam (226 parts) and m-xylylenediamine (272 parts) prepared by the method above (part (i)) was obtained in 83% yield after removal, by distillation, of excess m-xylylenediamine.

b. *Casting Resins from Epoxide and Poly (Amino-Amide)*

(1) 30 parts of a standard commercial epoxy resin (Epon 828, Shell Development Co., epichlorhydrin-bisphenol resin, liquid, average molecular weight 350–400 and having an epoxide equivalent (Molecular weight/ Number of epoxy groups) of 175–210) were thoroughly blended at room temperature with 7.2 parts of the reaction product of ε-caprolactam and tetraethylene pentamine (prepared above a. (i)). The resulting highly viscous liquid was poured into a mold coated with a silicone release agent (Dow Chemical). The resinous composition self-cured to a hard mass that could be removed from the mold in about 40 minutes. For superior thermal properties, the resin obtained above was subjected to a post-cure at about 120° for several hours.

(2) 30 parts of epoxy resin (Epon 828, Shell Development Co.) and 5.3 parts of the reaction product of ε-caprolactam and diethylene triamine (prepared above, a. (ii)) were thoroughly blended before pouring into a silicone coated mold. The mixture hardened at room temperature in about 30 minutes. The resin was then post-cured at 120° for four hours.

Comparison tests were made of the thermal properties and chemical resistance of castings prepared from Epon based compositions cured with various agents. Mixtures of epoxy resin (Epon 828) and the curing agents were cured as follows (a) poly (amino-amides) and basic compounds (polyamines) at room temperature for two hours followed by heating at 120° for four hours, (b) Versamid 125 [1] room temperature for two hours and 150° for 24 hours, (c) acid anhydrides at 85° for two hours followed by heating at 150° for 24 hours.

The poly (amino-amides) when employed as curing agents for epoxy resins, such as Epon 828, produce castings or potting compositions possessing high heat distortion temperatures as well as excellent chemical resistance.

TABLE 1

*Heat Distortion Temperatures of Epon 828—Curing Agent Castings*

| Curing Agent | Parts of Agent Per 100 parts Epon | *H.D.T.° |
| --- | --- | --- |
| Poly (amino-amide): | | |
| (a) Caprolactam-diethylene triamine | 17.7 | 140 |
| (b) Caprolactam-triethylene tetramine | 17.7 | 138 |
| (c) Caprolactam-tetraethylene pentamine | 17.7 | 145 |
| Acidic Compounds: | | |
| Dodecenyl succinic acid anhydride | 130.0 | 78 |
| Methyl-endomethylene tetrahydrophthalic acid anhydride | 85.0 | 143 |
| Hexahydrophthalic acid anhydride | 80.0 | 133 |
| Basic Compounds: | | |
| Diethylene triamine | 10.7 | 118 |
| Tetraethylene pentamine | 14.0 | 120 |
| m-Phenylenediamine | 14.0 | 144 |
| Versamid 125 | 47.0 | 101 |

* Heat distortion temperature determined according to Method D648–45T, A.S.T.M., part 6, page 296.

[1] Versamid 125 is a commercially available polyaminoamide prepared by condensation of polymerized unsaturated fatty acid with aliphatic amine and contains reactive amino, amide and carboxylic acid groups. Versamid 125 has an amine value (number of active hydrogen atoms divided by 0.01×molecular weight) of 290–320.

TABLE 2

*Chemical Resistance of Epon 828—Curing Agent Castings*

[Expressed percentage gain in weight after immersion for 30 days—standard size 1 cm. cube of cured composition used]

| Curing Agent | Water | $(CH_3)_2CO$ | $C_2H_3Cl_3$ | 1% $H_2SO_4$ | 10% NaOH | 1% $HNO_3$ |
| --- | --- | --- | --- | --- | --- | --- |
| Poly (amino-amide) | 0.7 | 0.8 | 0.1 | 1.0 | 0.7 | 1.6 |
| Polyamine | 0.6 | 2.0 | 0.4 | 1.0 | 0.5 | 1.4 |
| Versamid 125 | 0.9 | 3.0 | disintegrates | 1.5 | 0.8 | 1.6 |
| Hexahydrophthalic acid anhydride | 0.4 | 4.7 | 5.9 | 0.3 | 0.3 | 0.3 | c. *Coating Compositions From Epoxide and Poly (Amino-Amide)*

30 parts of commercial epoxy resin (Epon 1001 Shell Development Co., epichlorhydrin-bisphenol resin, solid with M.P. 64–76°, average molecular weight 900–1,000 and having an epoxide equivalent of 450–525) were dissolved in 33 parts of a solvent mixture of methyl ethyl ketone, diethylene glycol monoethyl ether and xylene (1:1:1 by weight), to which there was then added 3 parts of the reaction product of ε-caprolactam and tetraethylene pentamine (prepared as in part a. (i) above). The solution so obtained had a storage life of at least twenty-four hours. A typical coating on a clean steel plate was prepared by pouring the solution onto the plate and after ten minutes at room temperature curing at 120° for fifteen minutes in an air oven. Such a coating was tack-free, possessed excellent adhesion, good flexibility and good impact resistance.

d. *Adhesive Compositions from Epoxide and Poly (Amino-Amide)*

To a solution of 30 parts of epoxy resin (Epon 828, Shell Development Co.) in 6.6 parts cyclohexanone there was added 7.3 parts of the reaction product of ε-caprolactam and tetraethylene pentamine (prepared as in part a. (i) above). Such a solution has a storage life of about two hours at room temperature. Excellent adhesion of aluminum to aluminum was obtained by spreading a small amount of the epoxy-poly (amino-amide) solution on the aluminum pieces, clamping the so coated pieces together and heating in a 120° oven for 15 minutes.

Although certain preferred embodiments of the invention have been disclosed for purposes of illustration, it will be evident that various changes and modifications may be made therein without departing from the scope and spirit of the invention.

I claim:

1. Epoxy resins obtained by curing complex poly (amino-amide) epoxide compositions containing in substantial amounts complex resinous epoxides having 1,2 epoxide groups and hydroxyl groups along the polymer chain and the reaction products obtained by condensing ε-caprolactam with a polyamine containing at least two primary amino groups in the molar ratio of at least about 1 mol of caprolactam to 1 mol of polyamine.

2. Epoxy resins obtained by curing complex poly (amino-amide) epoxide compositions containing in substantial amounts complex resinous epoxides having 1,2 epoxide groups and hydroxyl groups along the polymer chain and the reaction products obtained by condensing ε-caprolactam with tetraethylene pentamine in the molar ratio of at least about 1 mol of caprolactam to 1 mol of said pentamine, said reaction product containing at least two amide groups and two primary amine groups per molecule.

3. Epoxy resins obtained by curing complex poly (amino-amide) epoxide compositions containing in substantial amounts complex resinous epoxides having 1,2 epoxide groups and hydroxyl groups along the polymer chain and the reaction products obtained by condensing ε-caprolactam with m-xylylene diamine in the molar ratio of at least about 1 mol of caprolactam to 1 mol of said diamine.

4. Epoxy resins obtained by curing complex poly (amino-amide) epoxide compositions containing in substantial amounts complex resinous epoxides having 1,2 epoxide groups and hydroxyl groups along the polymer chain and the reaction products obtained by condensing ε-caprolactam with diethylene triamine in the molar ratio of at least about 1 mol of caprolactam to 1 mol of said triamine.

5. Epoxy resin castings obtained by casting and curing a complex poly (amino-amide) epoxide casting composition containing epoxy resin having 1,2 epoxide groups and hydroxyl groups along the polymer chain and between 10 and 35% thereof by weight of a poly (amino-amide) obtained by reacting ε-caprolactam with tetraethylene pentamine in the molar ratio of at least about 1 mol of caprolactam to 1 mol of said pentamine, said reaction product containing at least two amide groups and two primary amine groups per molecule.

6. Epoxy resin castings obtained by casting and curing a complex poly (amino-amide) epoxide casting composition containing epoxy resin having 1,2 epoxide groups and hydroxyl groups along the polymer chain and between 10 and 35% thereof by weight of a poly (amino-amide) obtained by reacting ε-caprolactam with diethylene triamine in the molar ratio of at least 1 mol of caprolactam to 1 mol of said triamine.

7. Epoxy resin composition obtained by curing a complex poly (amino-amide) epoxide composition containing an epoxy resin having 1,2 epoxide groups and hydroxyl groups along the polymer chain and a solvent therefor in admixture with a poly (amino-amide), obtained by reacting ε-caprolactam with a polyamine containing at least two primary amino groups in the molar ratio of at least about 1 mol of caprolactam to 1 mol of polyamine, in an amount approximately equal to 17–25% by weight of said epoxy resin.

8. Epoxy resin composition obtained by curing a complex poly (amino-amide) epoxide composition containing an epoxy resin having 1,2 epoxide groups and hydroxyl groups along the polymer chain and a solvent therefor in admixture with the reaction product of ε-caprolactam and tetraethylene pentamine in the molar ratio of at least about 1 mol of caprolactam to 1 mol of said pentamine in an amount approximately equal to 17–25% by weight of said epoxy resin, said reaction product containing at least two amide groups and two primary amine groups per molecule.

9. Epoxy resin composition obtained by curing a complex poly (amino-amide) epoxide composition containing an epoxy resin having 1,2 epoxide groups and hydroxyl groups along the polymer chain and a solvent therefor in admixture with a solid (amino-amide) and a solvent therefor, said poly (amino-amide) obtained by reacting ε-caprolactam with a polyamine containing at least two primary amino groups in the molar ratio of at least about 1 mol of caprolactam to 1 mol of polyamine in an amount equal to 17–25% by weight of said epoxy resin.

10. The method of preparing an epoxy resin casting comprising blending an epoxy resin having 1,2 epoxide groups and hydroxyl groups along the polymer chain with 10–35% of a poly (amino-amide) obtained by reacting ε-caprolactam with a polyamine containing at least two primary amino groups in the molar ratio of at least about 1 mol of caprolactam to 1 mol of polyamine, introducing the mixture so obtained into a mold, permitting it to harden at room temperature and curing the hardened product at a temperature of about 120° C. for several hours.

11. The method of preparing an epoxy resin coating comprising blending an epoxy resin having 1,2 epoxide groups and hydroxyl groups along the polymer chain with a solvent and a poly (amino-amide), obtained by reacting ε-caprolactam with a polyamine containing at least two primary amino groups in the molar ratio of at least about 1 mol of caprolactam to 1 mol of polyamine, in an amount approximately equal to 17–25% by weight of said epoxy resin, coating a surface with said composition, permitting the coating to harden under atmospheric conditions, and curing the hardened product for a fractional part of an hour at a temperature of about 120° C.

12. The method of making a resin which comprises forming a homogeneous mixture of an epoxy resin having 1,2 epoxide groups and hydroxyl groups along the polymer chain and a solid poly (amino-amide) dissolved in a solvent therefor, said poly (amino-amide) obtained by condensing ε-caprolactam with a polyamine containing at least two primary amino groups in the molar ratio of at least about 1 mol of caprolactam to 1 mol of polyamine, and curing the mixture.

13. The method of making a resin which comprises forming a homogeneous mixture of an epoxy resin having 1,2 epoxide groups and hydroxyl groups along the polymer chain and a poly (amino-amide) obtained by condensing ε-caprolactam with a polyamine containing at least two primary amino groups in the molar ratio of at least about 1 mol of caprolactam to 1 mol of polyamine, and curing the mixture.

14. The method of making a resin which comprises forming a homogeneous mixture of an epoxy resin having 1,2 epoxide groups and hydroxyl groups along the polymer chain and a poly (amino-amide) obtained by condensing ε-caprolactam with a polyamine containing at least two primary amino groups in the molar ratio of at least about 1 mol of caprolactam to 1 mol of polyamine, and curing the mixture, at least a part of the cure being effected by heating for a short time above room temperature.

15. The method of preparing an epoxy resin casting comprising blending an epoxy resin having 1,2 epoxide groups and hydroxyl groups along the polymer chain with 10–35% of a poly (amino-amide) obtained by reacting ε-caprolactam with diethylene triamine in the molar ratio of at least about 1 mol of caprolactam to 1 mol of said triamine, introducing the mixture so obtained into a mold, permitting it to harden at room temperature and curing the hardened product at a temperature of about 120° C. for several hours.

16. The method of preparing an epoxy resin coating comprising blending an epoxy resin having 1,2 epoxide groups and hydroxyl groups along the polymer chain with a solvent and a poly (amino-amide) containing at least two amide groups and two primary amine groups per molecule obtained by reacting ε-caprolactam with tetraethylene pentamine in the molar ratio of at least about 1 mol of caprolactam to 1 mol of said pentamine in an amount approximately equal to 17–25% by weight of said epoxy resin, coating a surface with said composition, permitting the coating to harden under atmospheric conditions, and curing the hardened product for a fractional part of an hour at a temperature of about 120° C.

17. Epoxy resins obtained by curing complex poly (amino-amide) epoxide compositions containing in substantial amounts complex resinous epoxides having 1,2 epoxide groups and hydroxyl groups along the polymer chain and the liquid reaction products obtained by condensing ε-caprolactam with a polyamine containing at least two primary amino groups in the molar ratio of at least about 1 mol of caprolactam to 1 mol of polyamine.

18. Epoxy resins obtained by curing complex poly (amino-amide) epoxide compositions containing in substantial amounts complex resinous epoxides having 1,2 epoxide groups and hydroxyl groups along the polymer chain and the solution of the solid reaction products obtained by condensing ε-caprolactam with a polyamine containing at least two primary amino groups in the molar ratio of at least about 1 mol of caprolactam to 1 mol of polyamine.

References Cited in the file of this patent
UNITED STATES PATENTS
2,847,342   Kohn _____ Aug. 12, 1958

UNITED STATES PATENT OFFICE
CERTIFICATE OF CORRECTION

Patent No. 3,036,975                                      May 29, 1962

Bernard Taub

It is hereby certified that error appears in the above numbered patent requiring correction and that the said Letters Patent should read as corrected below.

Column 1, line 46, for "distoration" read -- distortion --; column 2, line 16, for "molor" read -- molar --; line 29, after "butylene" strike out the comma; column 4, TABLE 2, heading to column 5 thereof, for "1 % $H_2SO_4$" read -- 10% $H_2SO_4$ --; same TABLE 2, heading to column 7 thereof, for "1 % $HNO_3$" read -- 10% $HNO_3$ --.

Signed and sealed this 4th day of September 1962.

(SEAL)
Attest:

ERNEST W. SWIDER                                          DAVID L. LADD  
Attesting Officer                                              Commissioner of Patents